United States Patent [19]

Luczynski

[11] 4,117,963
[45] Oct. 3, 1978

[54] SPARE WHEEL AND TIRE HOLDER

[76] Inventor: Kazimierz Luczynski, 2866 Keele St., Apt. 5, Downsview, Ontario, Canada, M3M 2G8

[21] Appl. No.: 795,356

[22] Filed: May 9, 1977

[30] Foreign Application Priority Data

Jan. 18, 1977 [CA] Canada .................................. 269942

[51] Int. Cl.² .............................................. B60R 9/04
[52] U.S. Cl. ............................ 224/42.1 B; 224/42.12; 224/42.2; 224/42.25; 248/499; 280/179 A
[58] Field of Search ........... 224/29 R, 42.1 R, 42.1 B, 224/42.1 F, 42.1 G, 42.1 H, 42.1 E, 42.12, 42.13, 42.2, 42.23, 42.25, 42.24, 42.4, 42.41, 42.45 R, 42.39; 248/499; 296/37.2; 105/466, 469–473; 24/129 A; 280/179 A

[56] References Cited

U.S. PATENT DOCUMENTS

| 992,821 | 5/1911 | Stewart | 24/129 A |
|---|---|---|---|
| 1,588,121 | 6/1926 | Markert | 105/472 X |
| 2,753,095 | 7/1956 | Barassi et al. | 224/42.1 B |
| 3,179,316 | 4/1965 | McMiller | 224/42.1 B |

FOREIGN PATENT DOCUMENTS 769,029  2/1957  United Kingdom ................. 224/42.38

Primary Examiner—Trygve M. Blix
Assistant Examiner—Sherman D. Basinger
Attorney, Agent, or Firm—David W. Wong; Arne I. Fors; Robert F. Delbridge

[57] ABSTRACT

A holder device is adapted for fastening a spare wheel and tire directly on the roof of an automobile. The holder device, depending on the size of the spare tire, is provided with one or two cables which embrace the spare wheel and tire on the top of the roof in a horizontal position. The ends of the cables are grappled to the roof gutters by permanently connected catches, and the central portion of the cables are drawn in against the hub of the spare wheel by a tensioner so that the spare wheel and tire are securely pressed against its support.

7 Claims, 11 Drawing Figures

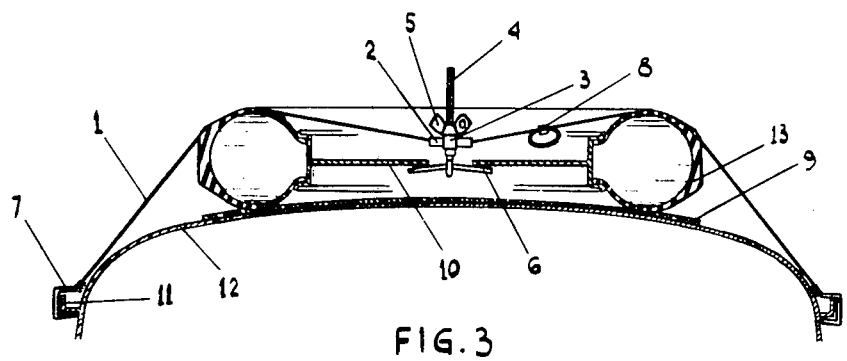
FIG.3
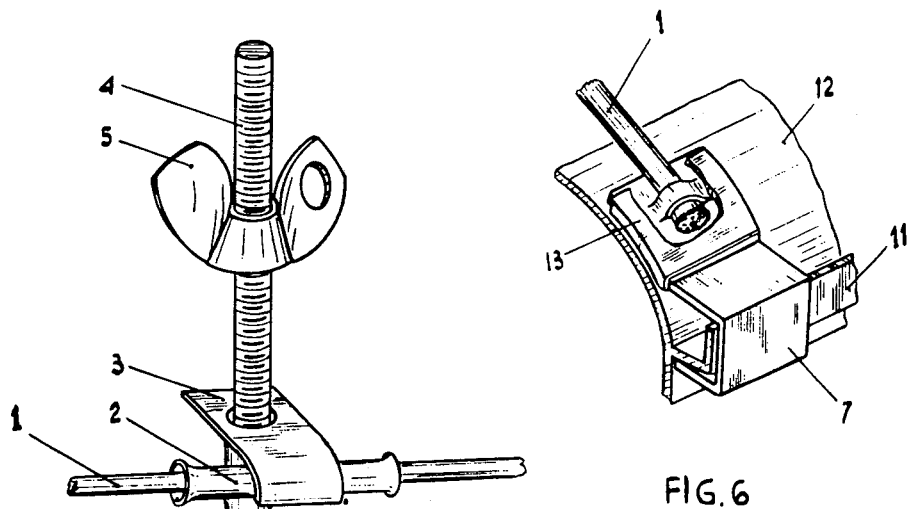
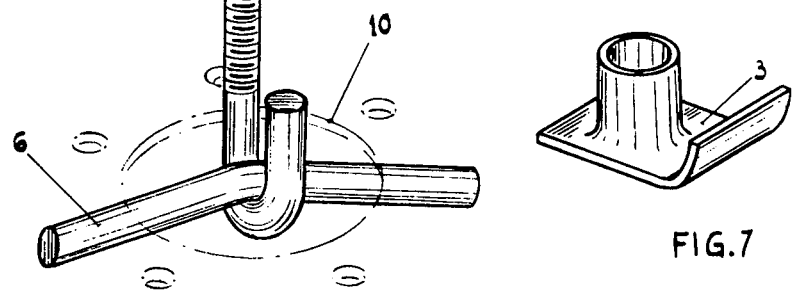
FIG.6
FIG.4
FIG.7
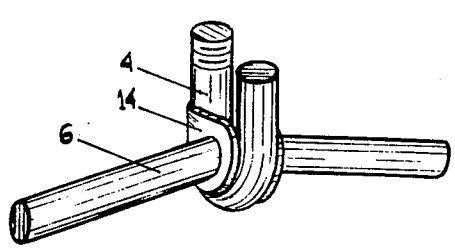
FIG.5

4,117,963

SPARE WHEEL AND TIRE HOLDER

BACKGROUND OF THE INVENTION

This invention relates to a device for mounting a spare wheel and tire on an automobile so as to provide maximum space in its storage trunk for carrying luggage.

As automobiles are becoming smaller in size in order to reduce their gasoline consumption, their luggage trunk space is inherently reduced, yet people still demand a large capacity for luggage in their automobile. Many space saving devices are now in use in association with automobiles for providing a maximum luggage carrying capacity. However, known devices are usually complex in structure and/or difficult to install. The present invention is designed to provide a simple, efficient, durable and practical device which requires only a small space for storage when it is not in use.

OBJECTS OF THE INVENTION

The principal object of the invention is therefore to provide a spare wheel and tire holder for fastening the spare wheel and tire directly on the roof of the automobile or indirectly thereon by means of a rigid support.

Another object of the invention is to provide, depending on the size of the spare wheel and tire, either a single or double cable holder for mounting the spare wheel and tire holder. In the case of a relatively large spare wheel and tire, a holder is provided with two cables.

Another object of the invention is to provide a spare wheel and tire holder which is comprised of standard parts so that it is relatively cheap to produce.

A still further object of the invention is to provide a device having a locking device to prevent the spare wheel and tire from being removed by theft.

BRIEF DESCRIPTION OF THE DRAWINGS

Other objects and advantages of the invention will become better understood hereinafter from a consideration of the specification with reference to the accompanying drawings forming part thereof, and in which like numerals correspond to like parts throughout the several views of the invention, and wherein:

FIG. 3 is a partial vertical sectional view of the single cable spare wheel and tire holder according to the invention in a fastened position with its anchor rod engaging with the hub of the spare wheel;

FIG. 4 is a perspective view of the tensioner for the single cable spare wheel and tire holder according to the present invention showing the arrangement of parts in the fastened state;

FIG. 5 is a perspective view of the rubber clamp provided on a connection of the brace rod with the anchor rod;

FIG. 6 is a perspective view of the permanent connection between the cable and the catch and the engagement of the catch with the roof gutter of the automobile in which a protective rubber band is provided on the catch;

FIG. 7 is a perspective view of the pulling clamp of the single cable holder;

DETAILED DESCRIPTION OF THE INVENTION

Figure 1:
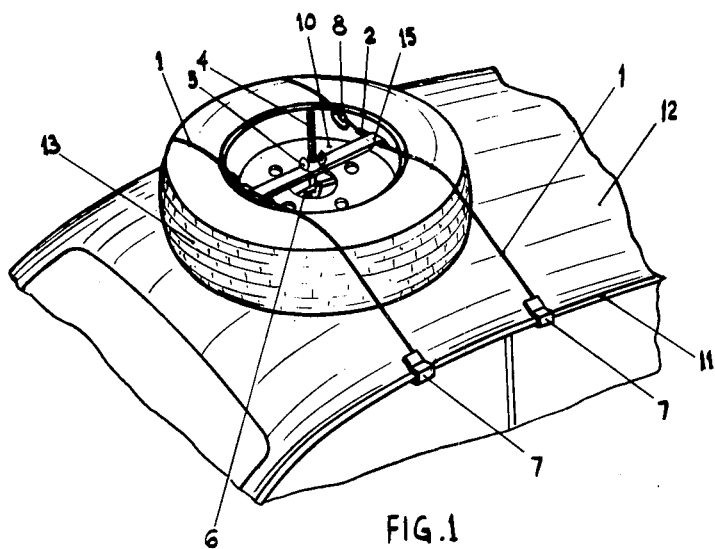
FIG. 1 is a perspective view of the spare wheel and tire fastened on the roof of an automobile by the double cable holder according to the present invention.
Figure 2:
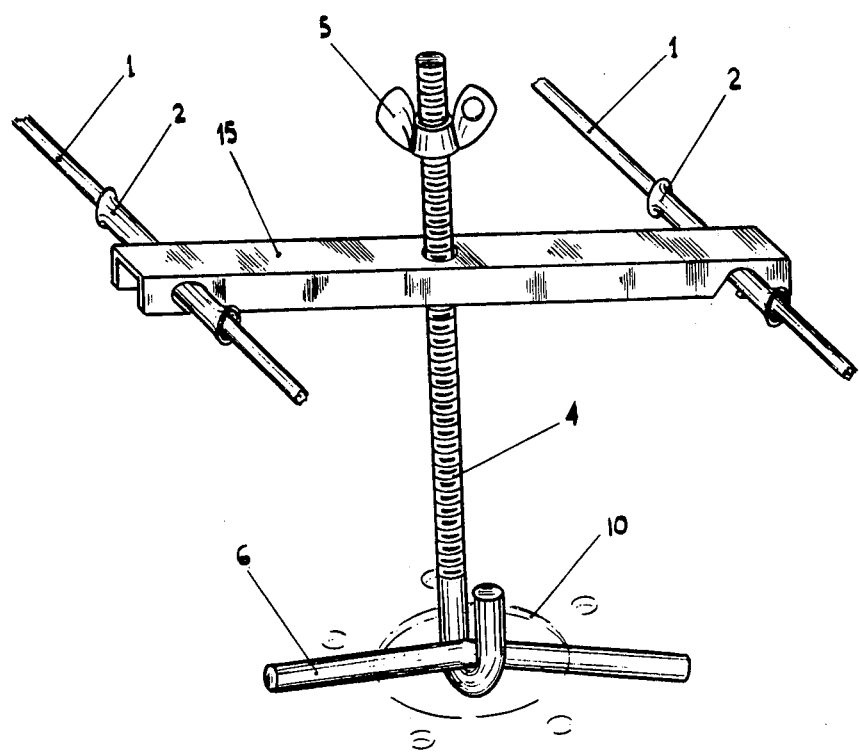
FIG. 2 is a perspective view of the tensioner for the double cable wheel and tire holder showing the arrangement of parts in the fastened state.

With reference to the drawings, a spare wheel 10 and tire 13 are mounted directly and horizontally on the roof 12 of an automobile. A plastic non-skid or sponge underlay 9 (FIG. 3) or a rigid support 16 (FIG. 8) may be provided between the wheel and the roof.

For a relatively large size spare wheel and tire, a holder having two cables 1 may be provided which are stretched in a spaced parallel manner over the wheel and tire assembly. The ends of the cables are grappled in the roof gutters 11 on both sides of the automobile roof by means of catches 7. The length of the cable 1 may be adjusted by looping it and securing this loop by a cable clamp 8 (FIGS. 1 and 3).

The cable 1 is made of such a material which has a substantially fixed length under various atmospheric conditions. The cable slidably engages with protective sleeve 2 provided on the pulling clamp 15 so as to prevent the cable from being damaged. A rubber coating may be provided over the catch 7 to prevent the roof from being scratched as well as covering the joint between the catch and the cable.

A tensioner is provided for the double cable holder for drawing a central portion of the cables against the hub of the spare wheel 10 by means of the pulling clamp 15.

The tensioner comprises a brace rod 4 having a threaded elongated shank and a U-shaped hook provided at one end therein. The pulling clamp 3 or 15 is slidably mounted on the brace rod 4. The anchor rod 6 has an extended V shape so that upon fastening the U-shaped hook will automatically engage with the angled center of the anchor rod. The anchor rod has a length longer than the diameter of the opening in the hub so that upon tightening the wing nut 5, the coaction of the pulling clamp 3 or 15 and the brace rod 4 and the anchor rod 6 will draw the cables to bind tightly against the wheel and tire.

To set the tensioner for fastening, the anchor rod 6 first placed diametrically across the opening of the hub and the U-shaped hook of the brace rod is urged downward to engage the angled center of the anchor rod. A rubber clamp 14 may be incorporated as shown in FIG. 5 for maintaining the hook safely engaged with the anchor rod. The pulling clamp 15 is slidably engaged with the brace rod 4 and the wing nut is secured on to the threaded shank. By tightening the wing nut 5, the pulling clamp will be pressed downward such that the central portion of cables 1 will be drawn against the hub to tie the wheel and tire on the roof of the automobile.

A padlock 20 may be incorporated in combination with the locking clamp 19 and the wing nut 5 to prevent the device from being tampered with by theft.

A protective tarpaulin cover 17 may be used to cover the wheel and tire or other items thus mounted on the roof of the automobile so as to protect them from weathering and to improve their appearance.

FIG. 4 shows a second embodiment in which a single cable tensioner is used. Apart from the short pulling clamp 3 and the single cable, the general structure of this embodiment is similar to that of the double cable embodiment.

Figure 8:
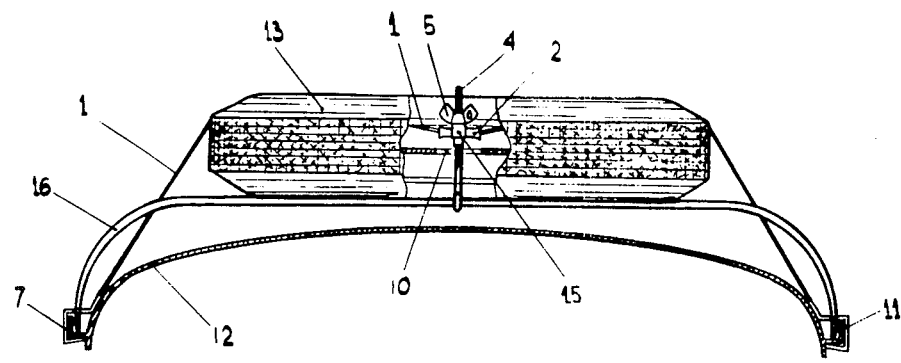
FIG. 8 is a partial vertical cutaway view showing the engagement between the brace rod of the tensioner and the rigid support of the spare wheel and tire.
Figure 9:
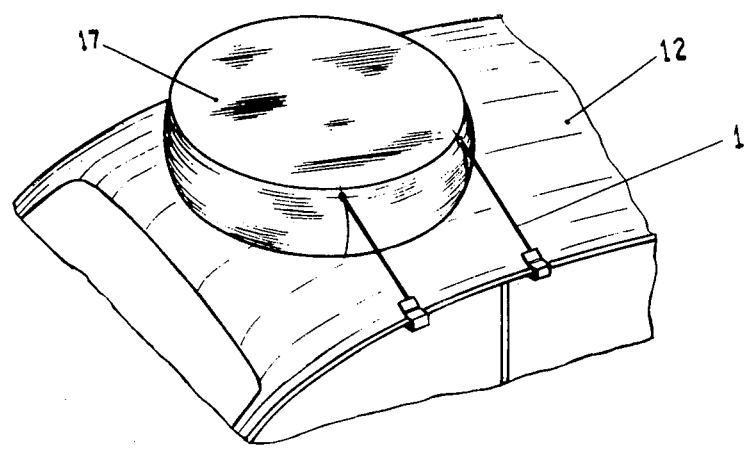
FIG. 9 is a perspective view showing the spare wheel and tire fastened and covered by a tarpaulin cover incorporated in the device of the present invention.
Figure 10:
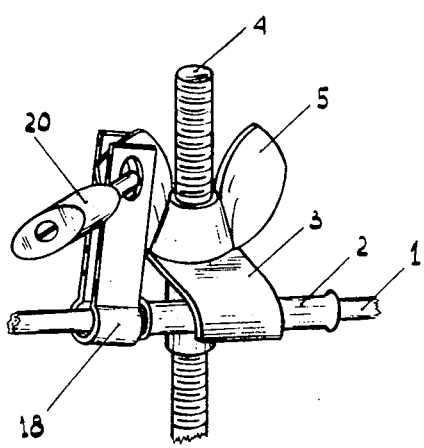
FIG. 10 is a perspective view showing the provision of a padlock and a locking clamp for locking the wing nut in the single cable holder.
Figure 11:
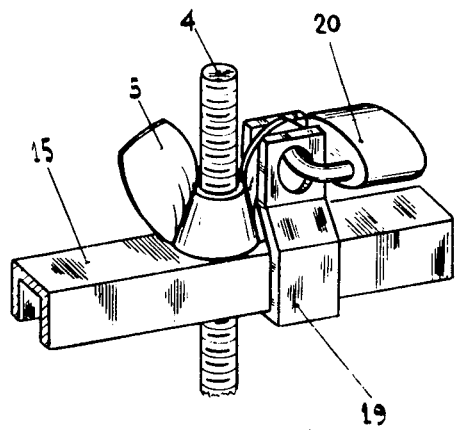
FIG. 11 is a perspective view showing the incorporation of the padlock and the locking clamp for locking the wing nut of the double cable holder.

When a rigid support 16 is used to support wheel and tire or other load, the brace rod 4 of the tensioner can engage directly to this support as illustrated in FIG. 8 without the use of the anchor rod.

While the invention has been particularly shown, it will be understood that various modification can be made in my invention as hereinabove described, and many apparently widely different embodiments of same may be made in the invention without departing from such spirit and scope.

What I claim as new and desire to protect by Letters Patent of the United States is:

1. A fastening device for mounting a spare wheel and tire disposed directly on the roof of an automobile having roof gutters, comprising two cable means operative to dispose over said spare wheel and tire and extend transversely over said roof, catch means provided at the ends of said cable means for securement of said ends to said roof gutters, length adjusting means provided on said cable means and operative to vary the length of said cable means, a bar member slidably mounted on said cable means and engageable with said spare wheel and tire, securing and tensioning means provided on said bar means operative to engage with said spare wheel and tire and adjustable cooperative with said spare wheel and tire for increasing the tension in said cable means so as to draw said cable means bindingly and tightly against said spare wheel and tire to fasten the latter over said roof.

2. A fastening device for mounting a spare wheel and tire according to claim 1, wherein said cable means are flexible wire ropes.

3. A fastening device for mounting a spare wheel and tire according to claim 2, wherein said tensioning and securing means comprises a bracing rod having a substantially U-shaped hook portion and an anchor rod means removably mounted to said spare wheel and tire and engageable with said hook portion of said bracing rod, said bracing rod having a threaded shank portion extending through an opening formed in said bar member, a wing nut provided on said shank portion and operative to draw said bar member and said anchor rod toward one another whereby said cable means presses bindingly and tightly against said spare wheel and tire to fasten the latter over said roof.

4. A fastening device for mounting a spare wheel and tire according to claim 3, wherein said length adjusting means comprises a rope clamp means provided on each of said wire ropes and a loop of a selected size being operatively formed in each of said ropes with said loop clamped by said rope clamp so as to maintain said ropes in a selected length.

5. A fastening device for mounting a spare wheel and tire according to claim 4, including a supporting sheet means operative to dispose between said spare wheel and tire and said roof of the automobile.

6. A fastening device for mounting a spare wheel and tire according to claim 5, including a protective cover means coverable over said spare wheel and tire which is mounted on said roof.

7. A fastening device for mounting a spare wheel and tire according to claim 6, including a locking means secured to said wing nut and said bar member to prevent said fastening device from being removed unintentionally.

* * * * *